(No Model.)
J. D. PIERCE.
FEED BOX.
No. 303,043. Patented Aug. 5, 1884.
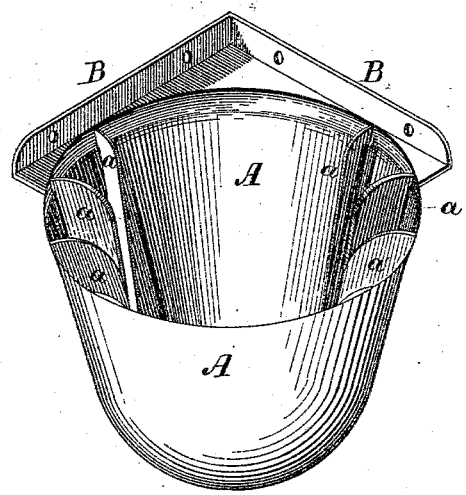
Witnesses:
Chas. L. Goss.
Frank Regensdorf.
Inventor,
James D. Pierce,
per E. H. Bottum
Attorney,

UNITED STATES PATENT OFFICE.

JAMES D. PIERCE, OF MILWAUKEE, WISCONSIN, ASSIGNOR OF ONE-HALF TO JAMES G. FLANDERS AND ELIAS H. BOTTUM, BOTH OF SAME PLACE.

FEED-BOX.

SPECIFICATION forming part of Letters Patent No. 303,043, dated August 5, 1884.

Application filed November 8, 1883. (No model.)

*To all whom it may concern:*

Be it known that I, JAMES D. PIERCE, a citizen of the United States, residing at Milwaukee, in the county of Milwaukee and State of Wisconsin, have invented certain new and useful Improvements in Improved Feed-Boxes, of which the following is a description.

My invention relates to feed boxes or mangers; and it consists, essentially, of a basin or trough provided with inwardly-projecting upright wings. Its object is to prevent waste of feed by preventing the animal from scooping or flirting the same out of the basin with his nose, and by supplying him with sufficient air for breathing while he is eating.

The accompanying drawing represents a perspective view of my improved device.

A is the basin proper, made of any convenient shape—round, oval, or square—according to the circumstances of each particular case. Any suitable material may be used in its manufacture, although I prefer cast-iron, of which the feed-box may be formed with wings complete at one operation in an ordinary sand mold.

*a a a* are inwardly-projecting wings located at the sides or ends of the basin A, and extending from the top of the same nearly to the bottom, in such manner as to prevent the animal from bringing his nose close enough to the sides to scoop or flirt the feed out of the basin. The wings *a a a*, keeping the nose of the animal away from the sides of the basin A, as just described, allow the grain or feed which he scoops up with his nose to fall between them to the bottom; at the same time they permit the free admission of air into the basin, so that the animal is able to breathe readily without raising his nose out of said basin. Any desired number of wings placed at convenient intervals from each other may be used. They may be perpendicular, oblique, or spiral, and in either form effect the same purpose without excluding air from the basin.

Many horses have the habit of flirting or scooping the feed out of their mangers by a sidewise throw of their noses, and it is for the purpose of preventing the consequent waste that I have provided the herein-described wings.

I have observed, also, that when air is not freely admitted to the feed-receptacle horses will raise their noses out of the same after filling their mouths, the result of which is that they scatter and waste more or less of their feed. With this fact in view, I have aimed to admit an ample supply of air into the bottom of the basin in such manner that the same shall not be shut off when the animal is feeding. I accomplish this important end by setting the wings *a a a* in an upright (or nearly upright) position, as above described.

B B represent perforated flanges for fastening the basin to the corner of the stall. Any other convenient means of attachment may be used, according to the form of the basin and its position in the stall.

Having thus described my invention, what I claim, and desire to secure by Letters Patent, is—

A feed-box or manger, A, having wide-open top and closed bottom, and provided with inwardly-projecting upright wings *a a a* upon its inner sides, substantially as and for the purposes set forth.

In testimony that I claim the foregoing as my own I affix my signature in presence of two witnesses.

JAMES D. PIERCE.

Witnesses:
 CHAS. L. GOSS,
 FRANK REGENSDORF.